United States Patent [19]

Henning et al.

[11] Patent Number: 4,857,565
[45] Date of Patent: Aug. 15, 1989

[54] PROCESS FOR THE CONTINUOUS PRODUCTION OF AQUEOUS POLYURETHANE DISPERSIONS AND THEIR USE AS A COATING COMPOSITION OR AS AN ADHESIVE

[75] Inventors: Wolfgang Henning, Kuerten; Walter Meckel, Neuss; Peter Fuhrmann, Cologne, all of Fed. Rep. of Germany

[73] Assignee: Bayer Aktiengesellschaft, Leverkusen, Fed. Rep. of Germany

[21] Appl. No.: 242,015

[22] Filed: Sep. 8, 1988

Related U.S. Application Data

[63] Continuation of Ser. No. 7,293, Jan. 27, 1987, abandoned.

[30] Foreign Application Priority Data

Feb. 8, 1986 [DE] Fed. Rep. of Germany ....... 3603996

[51] Int. Cl.$^4$ ............................................. C08L 75/04
[52] U.S. Cl. .................................. 523/343; 523/324; 523/340; 524/591; 524/840
[58] Field of Search ................. 524/591, 840; 523/343

[56] References Cited

U.S. PATENT DOCUMENTS

| 3,036,998 | 5/1962 | Rudner | 260/77.5 |
| 3,388,087 | 6/1968 | Dieterich et al. | 260/29.2 |
| 3,479,310 | 11/1969 | Dieterich et al. | 260/29.2 |
| 3,480,592 | 11/1969 | Dieterich et al. | 260/77.5 |
| 3,686,108 | 8/1972 | Reiff et al. | 260/29.2 |
| 3,756,992 | 9/1973 | Dieterich | 260/77.5 |
| 4,086,193 | 4/1978 | Reischl | 260/2.5 |
| 4,108,814 | 8/1978 | Reiff et al. | 260/29.2 |

FOREIGN PATENT DOCUMENTS

| 880485 | 6/1953 | Fed. Rep. of Germany . |
| 2427274 | 1/1976 | Fed. Rep. of Germany . |
| 821220 | 10/1959 | United Kingdom . |
| 1058339 | 2/1967 | United Kingdom . |
| 1076688 | 7/1967 | United Kingdom . |
| 1148244 | 4/1969 | United Kingdom . |
| 1336050 | 11/1973 | United Kingdom . |
| 1414930 | 11/1975 | United Kingdom . |
| 1428907 | 3/1976 | United Kingdom . |
| 1432112 | 4/1976 | United Kingdom . |

OTHER PUBLICATIONS

Angewandte Chemie 82, p. 53, 1970.
Angew. Makromolekulare Chemie, 1972.
Ullmanns, p. 24, lines 21–22.

Primary Examiner—C. Warren Ivy
Attorney, Agent, or Firm—Gene Harsh; Joseph C. Gil; Thomas W. Roy

[57] ABSTRACT

The present invention is directed to a continuous process for the production of aqueous polyurethane dispersions by continuously mixing solutions of polyurethanes or isocyanate prepolymers dissolved in an organic solvent with water and subsequently continuously removing at least a portion of the solvent using a circulation-type evaporator. The present invention is also directed to the production of coatings or adhesives by applying the aqueous polyurethane dispersions to a substrate.

6 Claims, No Drawings

PROCESS FOR THE CONTINUOUS PRODUCTION OF AQUEOUS POLYURETHANE DISPERSIONS AND THEIR USE AS A COATING COMPOSITION OR AS AN ADHESIVE

This application is a continuation of application Ser. No. 07/007,293 filed Jan. 27, 1987 and now abandoned.

BACKGROUND OF THE INVENTION

1. Field of the Invention

This invention relates to a continuous process for the production of aqueous polyurethane dispersions by continuous conversion of solutions of hydrophilically modified polyurethanes or hydrophilically modified NCO-prepolymers in an optionally aqueous organic solvent into an aqueous dispersion with continuous removal of the solvent present in the dispersion by distillation and to the use of the aqueous dispersions thus obtained as a coating composition or as an adhesive.

2. Description of the Prior Art

Processes for the production of aqueous polyurethane dispersions, which are understood to include both aqueous dispersions or suspensions of pure polyurethanes and polyurethane ureas, are known and described, for example, in the following literature references: DE-PS 880,485, DE-AS 1,044,404, US-PS 3,036,998, DE-PS 1,178,586, DE-PS 1,184,946, DE-AS 1,237,306, DE-AS 1,495,745, DE-OS 1,595,602, DE-OS 1,770,068, DE-OS 2,019,324, DE-OS 2,035,732, DE-OS 2,446,440, DE-OS 2,345,256, DE-OS 2,427,274, US-PS 3,479,310 and Angewandte Chemie 82, 53 (1970) and Angew. Makromol. Chem. 26, pp. 85 et seq. (1972).

Of the processes mentioned above, the "acetone process," analogous to the teaching of DE-OS 1,495,745 (US-PS 3,479,310) and DE-OS 1,495,847 (1,076,688), is particularly important. In this process, an NCO prepolymer is initially prepared, then dissolved in an inert solvent and finally chain-extended in solution to form the relatively high molecular weight polyurethane. The incorporation of the hydrophilic groups required for dispersion is preferably achieved either by incorporating diols containing ionic, potentially ionic or non-ionic hydrophilic groups in the prepolymer or by using corresponding amines as chain-extending agents. Dispersion is carried out discontinuously in vessels equipped with stirrers and, optionally, baffles. The solvent used is generally distilled off from the vessel immediately after dispersion in water.

Despite the excellent properties of the products obtained, the "acetone process" is attended by serious disadvantages. Because of the need to use a solvent, which in general is added to the prepolymer before chain extension and dispersion in the reaction vessel and is distilled off from the reaction vessel after dispersion, the space available inside the vessel can never be fully utilized. This has an adverse effect upon the volume-time yield and increases production costs. In addition, the often prolonged exposure of the dispersion to elevated temperature during removal of the solvent by distillation can give rise to problems in the case of temperature-sensitive dispersions. Moreover, the long distillation times often have an adverse effect upon the condition of the dispersed particles, particularly their degree of swelling. Further, in order to be reused, the solvent distilled off generally has to be freed from residues of water in a subsequent energy-intensive distillation step because the water remaining can react in undesirable secondary reactions with the NCO-groups of the prepolymer during its dissolution.

Processes for the production of aqueous polyurethane dispersions by continuous dispersion are also known. DE-OS 2,260,870 for example describes the use of special mixing reactors designed on the basis of developing cellular flow. Reactors such as these represent technically elaborate constructions in which both the chain-extension step and also the dispersion step are carried out, the position of the dispersion zone determining the chain-extension time. The size of the dispersion zone determines the particle size and particle size distribution of the dispersion. However, the size of the dispersion zone depends to a very large extent upon the stirrer speed and upon the throughput. On the other hand, the stirrer speed affects the development of the cellular flow. Accordingly, the system depends on the strict adherence to several parameters, which in practice is difficult to do over the long term. In addition, the solvent used in DE-OS 2,260,870 is separated off by means of a thin-layer evaporator. Although a thin-layer evaporator provides for very short residence times and favorable heat transfer values, it is attended by the disadvantage that film-forming dispersions show a tendency towards caking.

According to DE-OS 2,311,635, aqueous polyurethane dispersions are continuously prepared using impeller homogenizers in which chain-extension and dispersion take place at the same time. For dispersion, the prepolymers have to be introduced as a melt which generally requires relatively high temperatures. Further disadvantages include chain-extension in non-homogeneous phase and the use of emulsifiers so that coarse suspensions are generally obtained. According to DE-OS 2,344,135, aqueous polyurethane dispersions are continuously prepared using nozzles functioning on the countercurrent injection principle. In this case the chain-extending agent may be added before, during or after mixing of the prepolymer with the aqueous phase. In every case, however, the material discharged from the mixing chamber has to be stirred to achieve chain-extension. In other words the actual chain-extending reaction again takes place in non-homogeneous phase so that coarse suspensions are generally obtained.

Accordingly, an object of the present invention is to provide a new process for the continuous production of aqueous polyurethane dispersions which is not attended by any of the disadvantages referred to above. This problem was solved by the process according to the invention which is described in detail hereinafter.

SUMMARY OF THE INVENTION

The present invention relates to a process for the continuous production of aqueous polyurethane dispersions by mixing solutions of (a1) polyurethanes which are free from isocyanate groups and which contain chemically incorporated ionic and/or potential groups, chemically incorporated ethylene oxide units present within terminal and/or lateral polyether chains and/or external emulsifiers present in an amount sufficient to render the polyurethanes dispersible in water, or (a2) isocyanate prepolymers containing free isocyanate groups and which contain chemically incorporated potential ionic groups, chemically incorporated ethylene oxide units present within terminal and/or lateral polyether chains and/or external emulsifiers present in an amount sufficient to render the isocyanate prepolymers dispersible in water,
in (b) organic solvents having a boiling point below about 100° C. or mixtures of solvents such as these with up to about 50% by weight, based on the total weight of component (b), of water
with (c) water optionally containing in dissolved form a chain-extending agent reacting with the free isocyanate groups of component (a2) more quickly than water or a neutralizing agent for potential ionic groups, and subsequently removing at least a portion of the solvent (b) by distillation from the resulting aqueous solution, characterized in that the mixing is carried out continuously with the aid of dispersion units and removal of the solvent by distillation is subsequently carried out continuously using a circulation-type evaporator.

The present invention also relates to the use of the aqueous dispersions obtained by the process according to the invention as a coating composition for substrates of any kind or as an adhesive.

DETAILED DESCRIPTION OF THE INVENTION

The advantage of the process according to the invention lies in the fact that the volume-time yields obtained are considerably better than in the "acetone process" and removal of the solvent by distillation takes place more quickly with less stress to the end product, so that the products obtained in the process according to the invention are equivalent to or have better properties than the products of the "acetone process." In addition, it has been found that the solvent required for dissolving components (a1) and (a2) may even contain relatively large quantities of water without any adverse effect upon the practicability of the process according to the invention. In addition, the use of circulation-type evaporators in accordance with the invention for removal of the solvent by distillation affords the advantage that, even in the case of products having a tendency towards film formation, no film formation is observed by virtue of the constantly flooded surfaces of the evaporator. Finally, it is emphasized that the process according to the invention is an improvement over the conventional "acetone process" with regard to the production of stable aqueous polyurethane dispersions because it has been observed that, for the same chemical composition of the polyurethanes, the process according to the invention provides stable aqueous polyurethane dispersions, while the "acetone process" only provides unstable, sedimenting suspensions.

The polyurethanes or prepolymers to be dispersed in accordance with the invention are prepared from known starting materials, i.e. organic polyisocyanates and optionally monofunctional isocyanates, and compounds containing at least two isocyanate-reactive groups optionally monofunctional compounds.

Suitable polyisocyanates include (i) diisocyanates corresponding to the formula Q(NCO)$_2$, where Q is an aliphatic hydrocarbon radical containing 4 to 12 carbon atoms, a cycloaliphatic hydrocarbon radical containing 6 to 15 carbon atoms, an aromatic hydrocarbon radical containing 6 to 15 carbon atoms or an araliphatic hydrocarbon radical containing 7 to 15 carbon atoms. Examples of these diisocyanates include tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane, 4,4'-diisocyanatodicyclo-hexylmethane, 4,4'-diisocyanato-2,2-dicyclohexylpropane, 1,4-diisocyanatobenzene, 2,4-diisocyanatotoluene, 2,6-diisocyanatotoluene, 4,4'-diisocyanatodiphenylmethane, 4,4'-diisocyanato-2,2-diphenylpropane, p-xylylene diisocyanate, $\alpha,\alpha,\alpha',\alpha'$-tetramethyl-m- or -p-xylylene diisocyanate and also mixtures of these compounds.

Polyisocyanates suitable for use in accordance with the invention also include (ii) the NCO-group-containing prepolymers known per se from polyurethane chemistry which may be obtained by the reaction of simple diisocyanates of the type mentioned by way of example in (i) with organic polyhydroxyl compounds, preferably dihydroxy compounds of the type mentioned hereinafter using an NCO:OH equivalent ratio of about 1.2:1 to 10:1, preferably about 1.3:1 to 3:1. It can be seen from the equivalent ratio indicated that "NCO prepolymers" are also understood to include so-called "semiprepolymers" i.e. mixtures of excess, unreacted diisocyanates with genuine NCO-prepolymers.

Other polyisocyanates include (iii) hydrophilically modified polyisocyanates, for example diisocyanates containing lateral polyether chains with incorporated ethylene oxide units according to US-PS 3,920,598 or sulfonated diisocyanates of the type mentioned by way of example in DE-OS 2,227,111 and DE-OS 2,359,615. However, the use of hydrophilically modified polyisocyanates such as these is less preferred because, the hydrophilic groups are preferably incorporated through the synthesis components containing isocyanate-reactive groups which are described in detail hereinafter.

It is also possible to use any of the preceding polyisocyanates, in particular diisocyanates, in combination with higher functional, low molecular weight polyisocyanates such as the reaction product of 3 moles of 2,4-diisocyanatotoluene with 1 mole of trimethylol propane, and/or in combination with monofunctional isocyanates such as phenylisocyanate, hexylisocyanate or n-dodecylisocyanate. It is also possible in principle to use monofunctional isocyanates containing polyether chains with incorporated ethylene oxide units of the type mentioned by way of example in US-PS Nos. 3,920,598 and 4,237,264.

When monofunctional isocyanates such as these are used, premature chain termination may be prevented, particularly in the production of high molecular weight polyurethanes, by the simultaneous use of synthesis components having a functionality of more than two. It is preferred to use difunctional isocyanates of the type mentioned by way of example above.

Suitable synthesis components containing isocyanate-reactive groups include (iv) the polyhydroxy polyesters, polycarbonates or polyethers having a molecular weight of 400 to about 10,000, preferably 400 to about 4000 known from polyurethane chemistry, preferably difunctional compounds. Suitable polyhydroxy polyesters include those obtained by the reaction of polybasic acids, particularly difunctional acids, such as adipic acid, phthalic acid, tetrahydrophthalic acid and/or hexahydrophthalic acid, with excess quantities of polyhydric alcohols, preferably dihydric alcohols, of the type mentioned by way of example below in (v). Suitable polyethers include those obtained by the alkoxylation of suitable starting molecules such as for example water, ammonia, aniline or the polyhydric alcohols mentioned by way of example below in (v) with alkylene oxide such as ethylene oxide and/or propylene oxide.

Other suitable synthesis components (b) suitable for use in the process according to the invention include (v) polyhydric alcohols, particularly dihydric alcohols having a molecular weight of 62 to 399, especially the alkane polyols such as ethylene glycol, propylene glycol, hexamethylene diol, glycerol, trimethylol propane or trimethylol ethane, or the low molecular weight alcohols containing ether groups such as diethylene glycol, triethylene glycol, dipropylene glycol or tripropylene glycol. Mixtures of these alcohols may also be used in the process according to the invention.

Other suitable synthesis components containing isocyanate-reactive groups include (vi) compounds containing at least two aminic or hydrazinic amino groups and having a molecular weight of 32 to 400 such as ethylene diamine, hexamethylene diamine, isophorone diamine, 2,4-diaminotoluene, 4,4′-diaminodiphenylmethane, 4,4′-diaminodicyclohexylmethane, diethylene triamine, triethylene tetramine, hydrazine and hydrazine hydrate. Synthesis components such as these may also be used in blocked form, i.e. in particular in the form of the corresponding ketimines or ketazines (reaction products of amines or hydrazine with simple ketones such as acetone, methylethylketone or methylisobutylketone). When blocked chain-extending agents such as these are used, the isocyanate-reactive groups are only released under the hydrolytic influence of water.

Additional suitable synthesis components containing isocyanate-reactive hydrogen atoms include (vii) ionic synthesis components or potential ionic synthesis components which, in addition to preferably containing two isocyanate-reactive groups, contain at least one tertiary or quaternary ammonium group, a group convertible into such a group or carboxyl, carboxylate, sulfonic acid and/or sulfonate groups. The at least partial conversion of the groups convertible into salt groups of the type mentioned may take place before or during the mixing with water. The anionic synthesis components include diols containing sulfonate groups according to DE-OS 2,446,440 or DE-OS 2,437,218, diols containing carboxylate groups or carboxyl groups convertible into carboxylate groups and/or diaminosulfonates of the type described in CA-PS 928,323, such as for example the sodium salt of N-(2-aminoethyl)-2-aminoethane sulfonic acid, dimethylol propionic acid or the sodium salt of N-(2-aminoethyl)-2-aminopropionic acid. The synthesis components containing (potential) cationic hydrophilic groups include aminoalcohols containing tertiary amine nitrogen (wherein the tertiary nitrogen atoms may be at least partly converted into ternary or quaternary ammonium groups by neutralization or quaternization during or after the isocyanate polyaddition reaction) such as N-methyldiethanolamine, N-butyldiethanolamine, N-methyldiisopropanolamine, N-ethyldiethanolamine, N-ethyldiisopropanolamine or N,N′-bis-(2-hydroxyethyl)-perhydropyrazine. Also suitable are monohydric alcohols such as for example N,N-dimethylethanolamine, 2-(2-dimethylaminoethoxy)-ethanol, N,N-diethylethanolamine, 2-(2-diethylaminoethoxy)-ethanol, N,N-di-n-butylaminoethanol, N-(3-hydroxypropyl)-dimethylamine, N-(2-hydroxypropyl)-dimethylamine, 1-diethylamino-2-propanol or 1,3-bis-(dimethylamino)-2-propanol.

Synthesis components of this type also include analogous synthesis components containing at least one tertiary amino group, i.e. a potential ternary or quaternary ammonium group, which instead of the hydroxyl group or the hydroxyl groups contain at least one primary or secondary aminic or hydrazinic amino group. Examples include such as N-methyl-bis-(3-aminopropyl)-amine, N-methyl-bis-(2-amonoethyl)-amine or N,N′,N″-trimethyldiethylene triamine and monofunctional compounds such as 1-amino-2-diethylaminoethane, 1-amino-3-dimethylaminopropane, 1-amino-3-diethylaminopropane or N,N-dimethylhydrazine.

When cationic centers are to be incorporated in the polyurethanes or NCO-prepolymers to be dispersed in accordance with the invention, it is preferably achieved using synthesis components containing tertiary amino groups of the type mentioned by way of example with subsequent conversion of the tertiary amino groups incorporated into the corresponding ammonium groups by neutralization with inorganic or organic acids (such as hydrochloric acid, acetic acid, fumaric acid, maleic acid, cyanoacetic acid, lactic acid, tartaric acid, oxalic acid, N-methyl-N-(methylaminocarbonyl)-aminomethane sulfonic acid or phosphoric acid) or by quaternization with suitable quaternizing agents such as methylchloride, methyliodide, dimethylsulfate, benzylchloride, chloroacetic acid ethylester or bromoacetamide. Other examples of suitable neutralizing or quaternizing agents can be found in DE-OS 2,827,156. Basically, this neutralization or quaternization of the synthesis components containing tertiary nitrogen may be carried out before or during the isocyanate polyaddition reaction, although this is less preferred. It is also possible to introduce ternary or quaternary ammonium groups into the polyisocyanate polyaddition products through polyether polyols containing tertiary amino groups with subsequent neutralization or quaternization of the tertiary amino groups. However, this is also not preferred.

When carboxylate groups are to be incorporated in the polyurethanes or NCO-prepolymers to be dispersed in accordance with the invention, it may be done using synthesis components containing carboxylate groups, i.e. neutralized carboxyl groups, and isocyanate-reactive groups such as the triethylammonium salt of dimethylol propionic acid, or by incorporating compounds containing free carboxyl groups and isocyanate-reactive groups with subsequent neutralization of the incorporated carboxyl groups. One particularly suitable method for incorporating carboxylate groups is to use free dimethylol propionic acid in the preparation of the polyurethanes or NCO-prepolymers and subsequently neutralize the carboxyl group with a suitable neutralizing agent, for example triethylamine or sodium hydroxide.

When sulfonate groups are to be incorporated in the polyurethanes or NCO-prepolymers, it is best done by using compounds containing sulfonate groups and isocyanate-reactive groups, for example the above-mentioned aliphatic diols containing sulfonate groups according to DE-OS 2,446,440 or DE-OS 2,437,128.

The quantity in which the ionic or potentially ionic synthesis components are used or rather the degree of neutralization or quaternization is selected so that the polyurethanes ultimately obtained contain up to about 200, preferably about 1 to 200, more preferably 2 to 150 and most preferably about 5 to 100 milliequivalents of ionic groups, particularly =N⊕=, —COO⊖ or —SO₃⊖, per 100 g solids. It is also possible to incorporate both carboxylic and sulfonate groups in the polyurethanes or NCO-prepolymers to be dispersed in accordance with the invention. The simultaneous incorporation of anionic groups (carboxylate and/or sulfonate groups) and ammonium groups, in accordance with the teachings of DE-OS 2,721,985, is also possible in principle, but is not preferred.

Further, synthesis components containing isocyanate-reactive groups include (viii) monohydric or dihydric alcohols containing ethylene oxide units incorporated in polyether chains. Alcohols such as these include compounds corresponding to the following general formula

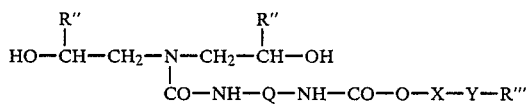

in which

Q represents a difunctional residue of the type obtained after removal of the isocyanate groups from a diisocyanate of the formula Q(NCO)₂ of the type mentioned above in (i), R" represents hydrogen or a monofunctional hydrocarbon radical containing from 1 to 8 carbon atoms, preferably hydrogen or a methyl group, R'" represents a monofunctional hydrocarbon radical containing from 1 to 12 carbon atoms, preferably an unsubstituted $C_1$-$C_4$ alkyl group, X represents a residue of the type obtained by removal of the terminal oxygen atom from a polyalkylene oxide chain containing about 5 to 90, preferably about 20 to 70 chain members wherein at least about 40%, preferably at least about 65% are ethylene oxide units and which, in addition to ethylene oxide units, may also contain propylene oxide, butylene oxide or styrene oxide units, preferably propylene oxide units, and Y represents oxygen or —NR$^{IV}$—, where R$^{IV}$ corresponds in its definition to R'".

The compounds corresponding to the formulae just illustrated may be produced by the processes according to US-PS 3,905,929 and US-PS 4,190,566. By using such synthesis components (viii), it is possible to incorporate ethylene oxide units present within lateral polyether chains in the polyurethanes or NCO-prepolymers to be dispersed in accordance with the invention.

Other possible synthesis components containing isocyanate-reactive groups include (ix) monohydric alcohols corresponding to the following formula

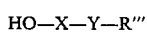

in which X, Y and R'" are as defined above.

When monofunctional nonionic hydrophilic polyethers are used, it is often advantageous to use synthesis components having a functionality of more than 2 in order to prevent premature chain termination. The monofunctional polyethers corresponding to the general formula just illustrated are prepared by known methods as described in US-PS Nos. 3,905,929, 4,190,566 or 4,237,264. By using monohydric alcohols of the type in question, it is possible to incorporate terminal polyether chains containing ethylene oxide units in the polyurethanes or NCO-prepolymers to be dispersed in accordance with the invention.

The synthesis components mentioned by way of example containing hydrophilic polyether chains and isocyanate-reactive groups are used in the preparation of the polyurethanes or NCO-prepolymers in such quantities that the polyurethanes ultimately obtained in dispersed form contain up to about 25%, preferably up to about 15% by weight, based on solids, of ethylene oxide units present within terminal or lateral polyether chains. The quantity of ionic and nonionic hydrophilic groups incorporated in the polyurethanes should be gauged in order to guarantee the dispersibility of the polyurethanes in water, unless it is desired to achieve dispersibility in water completely or in part by using external emulsifiers. Thus, it is possible in principle, but by no means preferred, to completely or partly dispense with the incorporation of hydrophilic centers of the type mentioned by way of example and to obtain hydrophilicity by using external emulsifiers.

These auxiliaries are chemically non-fixed, preferably nonionic emulsifiers, such as for example ethoxylated nonylphenol, polyoxyethylene laurylether or polyoxyethylene laurate, oleate or stearate; these additives generally containing from 8 to 50 oxyethylene units per molecule. These external emulsifiers may be added to the polyurethanes or NCO-prepolymers to be dispersed in accordance with the invention before the dispersion step.

Other synthesis components containing isocyanate-reactive groups which may optionally be used include (x) aminoalcohols containing primary and/or secondary amino groups and having a molecular weight of 61 to 300 such as for example ethanolamine, propanolamine, diethanolamine or dipropanolamine.

Finally, water is mentioned as another synthesis component containing isocyanate-reactive groups (xi) which may be used in accordance with the invention and which may perform the dual function of the continuous phase of the dispersions according to the invention on the one hand and that of a chain-extending agent on the other hand.

Difunctional synthesis components of the type mentioned by way of example are preferably used in the production of the polyurethanes or NCO-prepolymers to be dispersed in accordance with the invention. As already mentioned, however, it is also possible to use monofunctional synthesis components or, for the purpose of any molecular branching which may be desired, synthesis components having a functionality of more than 2.

The solvents (b) have a boiling point below 100° C. at normal pressure and are preferably inert to isocyanate groups. Examples of solvents such as these are benzene, ethylacetate, acetone, methylethylketone, diethylether, tetrahydrofuran, methylacetate, acetonitrile, chloroform, methylene chloride, carbon tetrachloride, 1,2-dichloroethane, 1,1,2-trichloroethane or tetrachloroethylene. It is preferred in use water-miscible solvents, particularly acetone. However, it is also possible in special cases, i.e. when the solvent is continuously introduced, to use solvents which are not inert to isocyanate groups and which have a boiling point below 100° C. at normal pressure. Solvents such as these include alcohols such as methanol, ethanol or isopropanol. In addition, up to about 50% by weight, preferably up to about 30% by weight and most preferably up to about 20% by weight, based on the total weight of component (b), may be water. This water may be introduced, for example, by using non-dried solvent or by using aqueous solutions of certain synthesis components in the production of the polyurethanes (a1) or prepolymers (a2). Aqueous solutions of synthesis components are, for example, aqueous solutions of aminic chain-extending agents. When aqueous solutions such as these are used, they are preferably mixed continuously with an organic solution of the NCO-prepolymer, preferably in acetone, prepared beforehand and the resulting aqueous-organic solution is continuously introduced into the dispersion step according to the invention, optionally after passing through a residence-time stage, for example in the form of tubular coils or cascades of vessels. Aqueous-organic solutions of fully reacted polyurethanes free from isocyanate groups or incompletely reacted prepolymers still containing free isocyanate groups are formed, depending both upon the equivalent ratio between the isocyanate groups of the prepolymer and the chain-extending agent present in aqueous solutions and upon the residence time which may be of any length, preferably up to about 15 minutes in length. These solutions are then introduced into the dispersion step according to the invention. When aqueous solvents are used for preparing the solutions of the NCO-prepolymers, the NCO-prepolymers to be dissolved are also preferably mixed continuously with the aqueous solvents.

The polyurethanes (a1) or the NCO-prepolymers (a2) may be produced by methods known per se. For example, they may be produced by initially preparing an NCO-prepolymer (a2) in the melt at about 20° to 150° C. and preferably at about 20° to 130° C. from organic diisocyanates of the type mentioned by way of example above in (i), optionally using hydrophilically modified polyisocyanates of the type mentioned by way of example in (iii) and compounds containing isocyanate-reactive groups of the type mentioned in (iv) and optionally (v), (vii), (viii) and/or (ix) while maintaining an equivalent ratio of isocyanate groups to isocyanate-reactive groups of about 1.2:1 to 5:1, and preferably about 1.2:1 and 3:1. Unless it has already been produced in a solvent, this NCO-prepolymer may then be taken up in a solvent of the type mentioned by way of example which, as indicated above, may have a water content of up to about 50% by weight and delivered in this form to the dispersion step. As already indicated, the solution mentioned may also be converted into a fully reacted polyurethane or into a chain-extended NCO-prepolymer with an aminic chain-extending agent of the type mentioned by way of example above in (vi) or (vii) (which may optionally be dissolved in water) at an equivalent ratio of isocyanate groups of the prepolymer to amino groups of the chain-extending agent of about 0.7:1 to 1:0.2 and preferably of about 0.8:1 to 1:0.4, optionally with addition of the after-reaction zone mentioned above.

In another variant for example, NCO-prepolymers prepared beforehand of the type mentioned by way of example above in (ii) are dissolved in a solvent of the type mentioned by way of example and the resulting solution is modified with an ionically modified diamine of the type mentioned by way of example in (vii), optionally used in the form of an aqueous solution. If this modifying reaction is carried out using an NCO-excess, based on the amino groups of the chain-extending agent, a solution of a prepolymer (a2) in the solvent (b) is formed. If this modification is carried out using an at least equivalent quantity of the chain-extending agent, a solution of a fully reacted polyurethane (a1) in the solvent (b) is formed.

Another variant of the preparation of a solution suitable for the process according to the invention comprises, for example, adding an external emulsifier to a prepared NCO-prepolymer of the type mentioned by way of example above in (ii), so that in contrast to the embodiments described above dispersibility of the NCO-prepolymer in water is guaranteed by the presence of an external emulsifier. In accordance with the foregoing observations, cationically modified NCO-prepolymers or polyurethanes could be produced by using a synthesis component chain-extending agents containing tertiary nitrogen atoms of the type mentioned by way of example in (vii) and converting the tertiary nitrogen atoms at least partly into ammonium groups by neutralization with an acid or quaternization.

In one particularly preferred embodiment of the process according to the invention, an NCO-prepolymer prepared beforehand from the starting materials mentioned by way of example is continuously dissolved in a solvent containing up to about 50% by weight water, the resulting solution is continuously mixed with an optionally water-containing aqueous solution of a chain-extending agent (vi) and/or (vii) and the resulting mixture is passed to the dispersion step, optionally after passing through the residence time stage mentioned above.

The continuous mixing units mentioned by way of example hereinafter may be used in all the continuous mixing processes mentioned here.

However, in all the embodiments of the preparation of the solutions to be used in the process according to the invention, it is important to ensure that the water content of the solutions is no more than about 50% by weight, preferably no more than about 30% by weight, based on the total weight of component (b). If at least about 50% and preferably at least about 70% of component (b) is made up of organic solvents, genuine solutions of the NCO-prepolymers or polyurethanes in organic medium are present and are only converted into an aqueous dispersion by mixing with additional water in accordance with the invention.

Basically, the preparation of the NCO-prepolymers or polyurethanes to be converted into an aqueous dispersion in the process according to the invention may also be carried out using the auxiliaries and additives known per se from polyurethane chemistry, including for example the accelerators for the isocyanate polyaddition reaction known per se from polyurethane chemistry. In general, however, there is no need to add such catalysts. Further auxiliaries and additives include solvents which have a boiling point above 100° C. at normal pressure such as diisopropylketone, xylene, dimethylformamide, dimethylacetamide, dimethylsulfoxide, methylglycol acetate, ethylglycol acetate, butylacetate or N-methylpyrrolidone. These solvents would ultimately remain in the dispersions according to the invention.

Other auxiliaries and additives include inert fillers, pigments, dyes, plasticizers or flow-influencing additives.

As already mentioned, it is also possible in the preparation of the polyurethanes or NCO-prepolymers to use solvents containing isocyanate-reactive groups, for example the monohydric alcohols mentioned above in this connection. These monohydric alcohols may be used for example as solvents for aminic chain-extending agents, because the reactivity of the amino groups of these chain-extending agents with isocyanate groups is far greater than the reactivity of the hydroxyl groups of the solvents. Thus, the monohydric alcohols would not be incorporated into the polyurethanes or NCO-prepolymers.

The solutions of polyurethanes (a1) or NCO-prepolymers (a2) in optionally aqueous solvents (b) which are used in the process according to the invention generally have a solids content of about 10 to 95% by weight. When solutions of prepolymers (a2) are used, these prepolymers generally have an NCO-content of about 0.01 to 5% by weight preferably about 0.1 to 2% by weight, based on solids. If only a few free NCO-groups are present, they generally react off with the water which is present in component (b) or with the chain-extension water. If solutions of prepolymers (a2) having a comparatively high NCO-content are used in the process according to the invention, it is often advisable to mix the solutions not with pure water, but rather with aqueous solutions of aminic or hydrazinic chain-extending agents of the type mentioned by way of example in (vi), so that chain-extension to the high molecular weight polyurethane containing urea groups takes place after the mixing of the solutions with water in accordance with the invention. Accordingly, it is possible in the production of amine-extended polyurethane polyureas to carry out chain-extension with the aminic chain-extending agent both before and also after the dispersion step.

It is also possible in principle to use solutions of polyurethanes (a1) or of prepolymers (a2) in optionally aqueous solvent (b), in which potential ionic groups (tertiary nitrogen atoms, carboxyl or sulfonic acid groups) are incorporated in the polyurethane or NCO-prepolymer and only converted into ionic groups during the step of mixing with water. In such a case, a solution of a corresponding neutralizing agent in water rather than pure water would be used, so that the conversion of the potential ionic groups into ionic groups by neutralization reaction would accompany the mixing process. However, this procedure is less preferred. Another less preferred variant comprises incorporating the optional external emulsifier in the dispersing water instead of in the organic solutions of (a1) or (a2).

Basically, it is also possible in the dispersion of the polyurethanes or the NCO-prepolymers (a1) or (a2) to use mixtures of (i) water or aqueous solutions of the above-mentioned additives with (ii) aqueous polymer latices compatible with the polyurethanes dispersions according to the invention instead of water or solutions of the above-mentioned additives in water. Polymer lattices such as these include aqueous dispersions of polyvinylacetate, polyethylene, polystyrene, polybutadiene, polyvinylchloride, polyacrylate, copolymers of the monomers corresponding to these polymers, or other aqueous polyurethane dispersions. When mixtures such as these are used, modified polyurethane dispersions are formed in the process according to the invention. Their properties are determined not only by the nature of the polyurethanes essential to the invention, but also by the nature of the polymers mentioned.

The quantity of water with which the solution of the polyurethane (a1) or NCO-prepolymer (a2) in optionally aqueous solvent (b) is mixed is generally about 0.3 to 5 parts by weight, preferably about 0.3 to 2 parts by weight of water per part by weight of the solution. In any event the amount is gauged so that a dispersion ("oil-in-water dispersion") is present after mixing water with the said solution which initially is a water-free solution or a "water-in-oil emulsion."

The mixing of the solutions of the polyurethanes (a1) or the NCO-prepolymers (a2) in the optionally aqueous solvent (b) with most of the water (or with an aqueous solution of a chain-extending or neutralizing agent) is carried out in suitable continuous mixing units. These mixing units are preferably rotor-stator systems such as flow mixers of the type made by Ekato RMT (Schopfheim; Federal Republic of Germany) and Lightnin (Neu-Isenburg; Federal Republic of Germany); barbed stirrers of the type made for example by Maschinenfabrik Hennecke GmbH (5205 St. Augustin 1, Federal Republic of Germany); impeller homogenizers, for example the Supraton ® machine made by Supraton Auer & Zucker OHG (North, Federal Republic of Germany) or the Dispax ® reactor made by Jahnke & Kunkel K G (Staufen, Federal Republic of Germany); or dispersion machines of the type described in DE-OS 3,319,921. The dispersion capacity varies from about 0.3 to 10 kW per liter of mixer volume, depending on the type of mixer used and on the viscosity of the components to be mixed.

In addition, the countercurrent injection nozzles described for example in DE-OS 2,344,135 or even parallel current injection nozzles may also be used with advantage for dispersion.

As already mentioned, continuous mixing units of the type mentioned by way of example may also be used for the preparation of the solutions (mixing of NCO-prepolymers with solvent), for modifying the solutions (for example chain-extension of the dissolved NCO-prepolymers with aminic chain-extending agents) or even for adding the quaternizing or neutralizing agent to polyurethanes or NCO-prepolymers containing potential ionic groups of the type mentioned by way of example. In addition to the above-mentioned mixing units, however, it is also possible to conduct these steps with static mixers, such as mixers comprising simple elements (for example coils in the Static Mixer made by Kenics Corp., USA), multichannel mixers (for example the AMK-Ross-ISG mixer made by Aachener Misch- und Knetmachinen-Fabrik, Federal Republic of Germany) or so-called packing mixers such as for example the static mixer made by Sulzer A G (Winterthur, Switzerland) or the BKM mixer made by Bayer A G (Leverkusen, Federal Republic of Germany).

After the continuous mixing of the solvents mentioned with the water, most of the solvent present in the dispersions is continuously removed by distillation. The distillation units used for this purpose are preferably evaporators comprising flooded evaporator surfaces, for example circulation-type evaporators with an external heating register, Rober evaporators, Herbert evaporators and long-tube evaporators of the type described in Ullmanns Enzyclopadie der Technischen Chemie, Vol. 2, pages 653–655.

Distillation is generally carried out at a temperature of about 20° to 100° C., preferably about 30° to 90° C. under a pressure of about 5 to 1100 mbar, and preferably about 10 to 300 mbar.

To obtain a low residual solvent content, it may be necessary to carry out the distillation in more than one stage. According to the invention, however, it is essential to use the continuous circulation-type evaporators described above in the first stage. Circulation-type evaporators are preferably used in the other distillation stages as well, although other evaporators such as flow evaporators or boiler evaporators, may also be used here in accordance with the invention.

In another embodiment of the process according to the invention, the solvent obtained after distillation, which may contain up to about 50% by weight, preferably up to about 30% by weight and more preferably up to about 20% by weight water, is returned to the beginning of the process for the preparation of the solutions of the polyurethanes (a1) or NCO-prepolymers (a2) in optionally water-containing solvent (b). If the distillation of the solvent from the aqueous dispersion is carried out in more than one stage, it is preferred directly to reuse only those distillates which have a water content of up to about 50% by weight, preferably up to about 30% by weight and more preferably up to about 20% by weight. To ensure that the solvent is within the maximum water content mentioned above, distillation may have to be carried out using a distillation column. It is of course also possible to free the solvent distillates completely or partly from water in a separate step, so that the water content lies within the limits mentioned above to enable the distillate to be reused at the beginning of the process.

An aqueous dispersion or solution of a polyurethane optionally containing urea groups and having a solids content of up to about 60% by weight, preferably about 15 to 60% by weight and more preferably about 20 to 50% by weight accumulates as "distillation residue" during removal of most of the solvent by distillation. In addition to any relatively high-boiling solvents present, this dispersion may also contain up to about 25% by weight, based on the total weight of the dispersion, of solvents having a boiling point below 100° C. at normal pressure.

When NCO-prepolymers are used, they are converted into high molecular weight polyurethanes by chain-extension with water or with aminic chain-extending agents dissolved in water at the latest during distillation process which generally takes place at elevated temperature.

If desired, the aqueous dispersions thus prepared may be subsequently modified with polyisocyanates in accordance with DE-OS 2,708,442.

The dispersions may optionally be blended with other dispersions, for example with polyvinylacetate, polyethylene, polystyrene, polybutadiene, polyvinylchloride, polyacrylate and copolymer plastics dispersions. The addition of chemically non-fixed, preferably ionic emulsifiers known per se is also possible, although of course unnecessary.

Finally, fillers, plasticizers, pigments, carbon black and silica sols, aluminium, clay, asbestos dispersions may also be incorporated in the dispersions.

The dispersions are generally stable, storable and transportable and may be processed at any later stage. They generally dry directly to form dimensionally stable plastics coatings, although forming of the process products may also be carried out in the presence of crosslinking agents known per se. The polyurethanes obtained differ in their properties according to the chemical composition selected and the content of urethane groups. Thus, it is possible to obtain soft, tacky compositions, thermoplastic and elastomeric products varying in hardness up to glasshard duroplasts. The hydrophilicity of the products may also vary within certain limits. The elastic products may be thermoplastically processed at elevated temperatures, for example at about 100° to 180° C., providing they are not chemically crosslinked.

The dispersions are suitable in principle for any of the usual applications of aqueous polyurethane dispersions as described, for example, in US-PS 3,479,310, column 9, lines 11 to 38. The dispersions are also particularly suitable for the production of glass fiber sizes, as binders for nonwovens and as plasticizers for gelatin or plastics dispersed in water.

In the following examples, all of the percentages are percentages by weight unless otherwise indicated.

EXAMPLES

EXAMPLE 1

In a spiked mixer (chamber volume 1.5, speed 1800 r.p.m.), a prepolymer solution having an NCO content of 0.94% by weight prepared from hexamethylene diisocyanate and a hydroxyl-containing mixed polyester of adipic acid, 1,6-hexane diol and neopentyl glycol (ratio by weight of the diols=11:6, average molecular weight of 1700) and dissolved in acetone to form a 27% solution was mixed with a 15% aqueous solution of the sodium salt of N-(2-aminoethyl)-2-aminoethane sulfonic acid. The prepolymer solution and the aqueous solution of the chain-extending agent were pumped from storage tanks by means of piston pumps, the prepolymer solution having a temperature for 50° C. and being pumped at 90 kg/h and the chain extender solution having a temperature of 21° C. and being pumped at 13.8 kg/h. After the spiked mixer, the solution passed through a spirally wound tube having a volume of 4.2 liter and, after a total residence time of approx. 3.3 mins., reached a second mixing reactor (Supraton ® machine manufactured by and commercially available from Supraton Auer & Zucker OHG, 4040 Neuss-Norf, Germany), wherein the chain-extended solution was mixed with water which had a temperature of 21° C. and which was pumped at a rate of 60 kg/h. The dispersion thus obtained passed through an intermediate vessel from which it passed into a continuous circulation-type evaporator (consisting of 2 WAT 15 screw heat exchangers and of a closure hood of the ABS 300/100 type manufactured by and commercial available from Schott-Glaswerke, Mainz, Germany) where it was freed from most of the acetone under a pressure of approx. 190 mbar and at a temperature of 45° C. The accumulated acetone had a water content of approximately 12%. The aqueous dispersion, freed from most of the acetone, was removed as a sidestream from the product circuit in the circulation-type evaporator. The dispersion still had a residual acetone content of around 10% and was continuously pumped into a convential distillation vessel from which more acetone was continuously distilled of under a pressure of 110 bar and at a temperature of 45° C. during the actual introduction of the dispersion. On completion of the continuous production process, most of the aqueous dispersion was in the distillation vessel and more acetone was distilled off over a period of another 30 minutes under the described conditions. A stable aqueous dispersion which had the appearance of an opaque solution, a solids content of 27% and a sulfonate group content of 41.5 milliequivalents per 100 g solids was ultimately obtained. The dispersion remained stable for 15 minutes in a centrifuge (3000 r.p.m.).

EXAMPLE 2

(Comparison Example with Example 1)

In a 500 liter vessel, 37.75 kg of the 15% aqueous chain-extender solution of Example 1 were added at 50° C. to 243 kg of the prepolymer solution of Example 1, followed by stirring for 10 minutes. The product was then dispersed with 162 kg water and the solvent was distilled of in vacuo immediately afterwards.

An opaque solution having a solids content of 27% by weight and an $SO_3$ group content of 41.5 milliequivalents per 100 g solids was obtained. When a sample of the dispersion was exposed to the gravitational field of a centrifuge (3000 r.p.m.$^{-1}$, 15 mins.), a deposit of a fine-grained sediment was formed.

EXAMPLE 3

In a spiked mixer (chamber volume 1.5 liter, speed 1800 r.p.m.), a prepolymer solution (having an NCO content of 0.95% by weight, prepared from hexamethylene diisocyanate and the mixed polyester set forth in Example 1 at an NCO:OH equivalent ratio of 1.79:1 and dissolved in acetone to form a 29% solution) was mixed with a 10.5% aqueous solution of the sodium salt of N-(2-aminoethyl)-2-aminoethane sulfonic acid (AAS) and ethylene diamine (ADA) (molar ratio AAS-:ADA=1:3). The prepolymer solution and the aqueous solution of the chain-extending agent were pumped from storage tanks by means of piston pumps, the prepolymer solution having a temperature of 50° C. and being pumped at 90 kg/h and the chain-extender solution having a temperature of 21° C. and being pumped at 5.28 kg/h. After the spiked mixer, the solution passed through a spirally wound tube having a volume of 4.2 liter and, after a total residence time of approx. 3.6 mins., reached a second mixing reactor (Supraton machine), to which the chain-extended solution was mixed with water which had a temperature of 21° C. and was pumped at 40.5 kg/h. After dispersion, the product passed through an intermediate vessel from which it was transported into the evaporator described in Example 1 by means of the vacuum of 190 mbar applied to the circulation-type evaporator. Removal of the solvent by distillation was carried out in the same way as in Example 1.

A stable, finely divided dispersion having a solids content of 40% by weight and an $SO_3$ group content of 5.6 milliequivalents per 100 g solids was ultimately obtained.

EXAMPLE 4

(Comparison Example with Example 3)

In a 500 liter vessel, 17.7 kg of the 10.5% aqueous chain-extender solution of Example 3 were added at 50° C. to 300.1 kg of the prepolymer solution of Example 3, followed by stirring for 10 minutes. The product was then dispersed with 135 kg water and the solvent was distilled off in vacuo immediately afterwards.

The suspension obtained, which had a solids content of 40% by weight and an $SO_3$-group content of 5.6 milliequivalents per 100 g solids, was made up of coarse particles and sedimented after a short time.

EXAMPLE 5

In a spiked mixer (chamber volume 1.5 liter, speed 1800 r.p.m.), a prepolymer (having an NCO content of 3.11% by weight, prepared from hexamethylene diisocyanate and a hydroxyl-containing mixed polyester of adipic acid, 1,6-hexane diol and neopentyl glycol (ratio by weight of the diols=11:6) having an average molecular weight of 2000 at an NCO:OH equivalent ratio of 1.9:1) was continuously mixed with an aqueous acetone solution having a water content of 10%. The prepolymer had an temperature of 90° C. and the aqueous acetone solution had a temperature of 21° C. To this end, the prepolymer was pumped through a pipe heated to 90° C. at 30 kg/h by means of a gear pump and the aqueous acetone which was continuously removed from the distillation receiver of the circulation-type evaporator, was pumped at approx. 57 kg/h by means of a piston pump. (Approximately 10 kg aqueous acetone was introduced into the distillation receiver at the beginning of the test.) Immediately afterwards, the dissolved prepolymer was mixed in a second spiked mixer with a 10% aqueous solution of the sodium salt of N-(2-aminoethyl)-2-aminoethane sulfonic acid (AAS) and ethylene diamine (ADA) (molar ratio of AAS-:ADA=1:0.75). The aqueous solution of the chain-extending agent was pumped from a storage tank by means of a piston pump, the chain-extender solution having a temperature of 21° C. and being pumped at 10.5 kg/h. After the spiked mixer, the solution passed through a spirally wound tube with a volume of 4.2 liter and, after a total residence time of approx. 3.5 mins., reached a third mixing reactor (spiked mixer) in which the chain-extended solution was mixed with water which had a temperature of 21° C. and which was pumped at a rate of 48 kg/h. After dispersion, the product passed through an intermediate vessel from which it was transported into the evaporator by means of the vacuum of approx. 190 mbar applied to the circulation-type evaporator according to Example 1. Removal of the solvent by distillation was carried out in the same way as described in Example 1. The quantities of acetone accumulating as distillate from the circulation-type evaporator were returned to the beginning of the process. The acetone fractions have a water content of 10%.

A stable finely divided dispersion having a solids content of 40% by weight and an $SO_3$-group content of 14.3 milliequivalents per 100 g solids was obtained.

EXAMPLE 6

A prepolymer solution having an NCO content of 1.75% by weight was prepared from hexamethylene diisocyanate, the mixed polyester of Example 1 and N-methyldiethanolamine at an NCO:OH equivalent ratio of 1.9:1 and a molar ratio of polyester to N-methyldiethanolamine of 1:0.77. After the prepolymer was dissolved in acetone to form a 35% solution, it was mixed with a 16.7% aqueous solution of isophorone diamine in a spiked mixer (chamber volume 1.5 liter, speed 1800 r.p.m.). The prepolymer solution and the aqueous solution of the chain-extending agent were pumped from storage tanks by means of piston pumps, the prepolymer solution having a temperature of 50° C. and being pumped at 90 kg/h and the chain extender solution having a temperature of 21° C. and being pumped at 13.4 kg/h. After the spiked mixer, the solution passed through a spirally wound tube having a volume of 4.2 liter and, after a total residence time of approx. 3.3 mins., reached a second mixing reactor (spiked mixer) in which the chain-extended solution was mixed with N-methyl-N-(methylaminocarbonyl)-aminomethane sulfonic acid (50% aqueous solution), which had a temperature of 21° C. and which was pumped at a rate of 2.06 kg/h. After the resulting neuturalization, the solution passed into a third mixing reactor (Supraton machine) in which it was mixed with water which had a temperature of 21° C. and which was pumped at 43 kg/h. After dispersion, the product passed through an intermediate vessel from which it was transported into the circulation-type evaporator described in Example 1 by means of the vacuum of approx. 190 mbar applied to the circulation-type evaporator. Removal of the acetone by distillation was carried out as described in Example 1.

A stable dispersion having a solids content of 40% by weight and a cationic group ($=N=^{\oplus}$) content of 29.6 milliequivalents per 100 g solids was ultimately obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for the production of an aqueous polyurethane dispersion which comprises continuously mixing a solution of
   (a1) a polyurethane free from isocyanate groups wherein the dispersibility in water is provided by a member selected from the group consisting of chemically incorporated potential ionic groups which are subsequently neutralized, chemically incorporated ionic groups, chemically incorporated ethylene oxide units present within terminal polyether chains, chemically incorporated ethylene oxide units present within lateral polyether chains, external emulsifiers in physical admixture with said polyurethane and mixtures thereof, or
   (a2) an isocyanate prepolymer containing free isocyanate groups wherein the dispersibility in water is provided by a member selected from the group consisting of chemically incorporated potential ionic groups which are subsequently neutralized, chemically incorporated ionic groups, chemically incorporated ethylene oxide units present within terminal polyether chains, chemically incorporated ethylene oxide units present within lateral polyether chains, external emulsifiers present in physical admixture with said prepolymer and mixtures thereof,
   in
   (b) an organic solvent having a boiling point below 100° C. or a mixture of said solvent with up to about 50% by weight, based on the total weight of component (b), of water,
   with
   (c) water in an amount sufficient to provide an oil-in-water emulsion, and subsequently removing by continuous distillation at least a portion of the solvent (b) from the resulting aqueous dispersion by means of a circulation-type evaporator having flooded evaporator surfaces.

2. The process of claim 1 wherein an isocyanate prepolymer (a2) is present and component (c) additionally contains in dissolved form a chain-extending agent which is more reactive with the free isocyanate groups of component (a2) than water.

3. The process of claim 1 wherein component (a1) or (a2) contains chemically incorporated potential ionic groups and component (c) additionally contains a neutralizing agent for the chemically incorporated potential ionic groups.

4. The process of claim 1 wherein the polyurethane of said aqueous polyurethane dispersion has a content of incorporated carboxylate and/or sulphonate groups or a content of chemically incorporated ammonium groups of about 1 to 200 milliequivalents per 100 g of solids.

5. The process of claim 1 which comprises recovering the solvent containing about up to 50% by weight water by distillation and reusing said solvent as component (b).

6. A process for the production of a coated substrate which comprises
   (a) preparing an aqueous polyurethane dispersion in accordance with claim 1 and
   (b) applying said aqueous polyurethane dispersion to a substrate.

* * * * *